United States Patent
Hoshi et al.

(10) Patent No.: US 9,227,530 B2
(45) Date of Patent: Jan. 5, 2016

(54) VEHICLE SEAT

(75) Inventors: Masayuki Hoshi, Tochigi (JP); Yuusuke Satou, Aichi (JP); Mitsunobu Nishioka, Aichi (JP); Takuto Esaki, Aichi (JP)

(73) Assignees: TS TECH CO., LTD., Saitama (JP); IMASEN ELECTRIC INDUSTRIAL CO., LTD., Aichi (JP)

( * ) Notice: Subject to any disclaimer, the term of this patent is extended or adjusted under 35 U.S.C. 154(b) by 142 days.

(21) Appl. No.: 13/877,869

(22) PCT Filed: Oct. 12, 2010

(86) PCT No.: PCT/JP2010/067856
§ 371 (c)(1),
(2), (4) Date: Apr. 4, 2013

(87) PCT Pub. No.: WO2012/049726
PCT Pub. Date: Apr. 19, 2012

(65) Prior Publication Data
US 2013/0200677 A1 Aug. 8, 2013

(51) Int. Cl.
*B60N 2/16* (2006.01)
*B60N 2/68* (2006.01)

(52) U.S. Cl.
CPC *B60N 2/16* (2013.01); *B60N 2/165* (2013.01); *B60N 2/1615* (2013.01); *B60N 2/682* (2013.01)

(58) Field of Classification Search
CPC ........................................................ B60N 2/16
USPC ........................................ 297/344.12, 344.15
See application file for complete search history.

(56) References Cited

U.S. PATENT DOCUMENTS

| | | | | |
|---|---|---|---|---|
| 4,648,654 | A * | 3/1987 | Voss | 297/313 |
| 4,720,070 | A * | 1/1988 | Nishino | B60N 2/1864 |
| | | | | 248/394 |
| 4,729,539 | A * | 3/1988 | Nagata | 248/575 |
| 4,973,105 | A * | 11/1990 | Itou | 297/344.12 |
| 6,641,215 | B2 * | 11/2003 | Rohee | 297/344.12 |
| 7,066,540 | B2 * | 6/2006 | Minai et al. | 297/344.15 |
| 7,712,835 | B2 * | 5/2010 | Kubota | 297/344.15 |

(Continued)

FOREIGN PATENT DOCUMENTS

| | | |
|---|---|---|
| EP | 1 905 640 A2 | 4/2008 |
| JP | 3-20693 | 2/1991 |

(Continued)

OTHER PUBLICATIONS

Office Action issued in the counterpart German patent application No. 112010005932.2 on Aug. 31, 2015 and corresponding English translation.

*Primary Examiner* — David R Dunn
*Assistant Examiner* — Timothy J Brindley
(74) *Attorney, Agent, or Firm* — Hamre, Schumann, Mueller & Larson, P.C.

(57) ABSTRACT

A vehicle seat with a height adjustable seat bottom, includes a side frame (30) which constitutes left and right frames of the seat bottom, a linkage configured to render a height of the side frame adjustable, and an operation knob assembly (10) including an operation knob (12) for adjustment of the height of the side frame (30). The operation knob assembly (10) includes a fixing portion (15) protruding toward the side frame (30) and being fixed to the side frame (30) in a position inwardly of the operation knob (12) with respect to a direction of an axis (11) of rotation of the operation knob (12).

14 Claims, 6 Drawing Sheets

(56) References Cited

U.S. PATENT DOCUMENTS

| | | |
|---|---|---|
| 7,766,427 B2 | 8/2010 | Kojima et al. |
| 8,162,404 B2 * | 4/2012 | Ueda .......................... 297/463.1 |
| 8,292,367 B2 * | 10/2012 | Park .......................... 297/344.12 |
| 2007/0273193 A1 * | 11/2007 | Ichikawa et al. .......... 297/344.12 |
| 2008/0079300 A1 | 4/2008 | Kojima et al. |
| 2009/0026791 A1 | 1/2009 | Ishijima et al. |
| 2009/0127907 A1 * | 5/2009 | Hoshi et al. .............. 297/344.12 |
| 2009/0267397 A1 * | 10/2009 | Kubota .................... 297/344.15 |
| 2009/0273218 A1 * | 11/2009 | Park .......................... 297/284.6 |
| 2009/0294259 A1 | 12/2009 | Kuno et al. |
| 2010/0001569 A1 * | 1/2010 | Shinozaki ................ 297/344.15 |
| 2010/0109406 A1 | 5/2010 | Ueda |

FOREIGN PATENT DOCUMENTS

| | | |
|---|---|---|
| JP | 9-301026 | 11/1997 |
| JP | 10-338063 | 12/1998 |
| JP | 11-245692 | 9/1999 |
| JP | 2001-171400 | 6/2001 |
| JP | 2006-182039 | 7/2006 |
| JP | 2007-196896 | 8/2007 |
| JP | 2007-196897 | 8/2007 |
| JP | 2008-12034 | 1/2008 |
| JP | 2008-132904 | 6/2008 |
| JP | 2008-254595 | 10/2008 |
| JP | 2009-247533 | 10/2009 |

* cited by examiner (a)

(b)

(a)

(b)

(c)

(d)

(a)

(b)

VEHICLE SEAT

TECHNICAL FIELD

The present invention relates to a vehicle seat with a height-adjustable seat bottom.

BACKGROUND ART

A vehicle seat in which an operation knob is provided at a seat side frame (side frame) and a height of the seat (its seat bottom) can be adjusted by operating/turning the operation knob is hitherto known in the art (Patent Literature 1). In the seat described in Patent Literature 1, the operation knob is provided via a bearing frame to the side frame. To be more specific, the bearing frame includes a plurality of fixing portions protruding in radially outward directions of the operation knob and having through holes formed therein, and is fixed to the side frame at these fixing portions.

CITATION LIST

Patent Literature

Patent Literature 1: JP 2006-182039 A

SUMMARY OF INVENTION

Technical Problem

In recent years, there is a need of the vehicle seat having a miniaturized side frame. However, the conventional configuration as described above in which a plurality of fixing portions protruding in radially outward directions of the operation knob are provided requires a large space for fixing the operation knob (bearing frame), and thus has limitations on miniaturization of the side frame.

With this in view, it is one object of the present invention to provide a vehicle seat of which a side frame can be further miniaturized.

Solution to Problem

According to the present invention for attaining the aforementioned object, a vehicle seat with a height-adjustable seat bottom comprises a side frame which constitutes left and right frames of the seat bottom, a linkage configured to render a height of the side frame adjustable, and an operation knob assembly including an operation knob configured to be rotated to actuate the linkage for adjustment of the height of the side frame, wherein the operation knob assembly includes a fixing portion protruding toward the side frame and being fixed to the side frame in a position inwardly of the operation knob with respect to a direction of an axis of rotation of the operation knob.

With this configuration, the operation knob assembly includes a fixing portion protruding toward the side frame and being fixed to the side frame in a position inwardly of the operation knob with respect to a direction of an axis of rotation of the operation knob, and thus, the operation knob assembly can be miniaturized in the radial directions of the operation knob. As a result, the space for fixing the operation knob assembly can be reduced, so that the further miniaturization of the side frame can be achieved.

In the vehicle seat described above, the side frame may preferably include laterally bent reinforced portions disposed at least in positions above and below a portion of the side frame to which the operation knob assembly is fixed.

With this configuration, the side frame can, while being miniaturized, have an enhanced rigidity (in at least a portion thereof to which the operation knob assembly is fixed). Moreover, the enhanced rigidity can provide improved operation stability to the operation knob and the linkage.

The aforementioned reinforced portions may be formed by bending upper and lower ends of the portion to which the operation knob assembly is fixed, toward a side at which the operation knob assembly is fixed.

With this configuration, in addition to the enhanced rigidity of the side frame, lateral miniaturization of the side frame to which the operation knob assembly is fixed can be achieved in comparison with a configuration in which the upper and lower ends are bent toward a side opposite to the side at which the operation knob assembly is fixed.

In the configuration where the upper and lower ends of the portion of the side frame is bent toward the side at which the operation knob assembly is fixed, respective end portions of the upper end and the lower end may be folded back toward a side opposite to the side at which the operation knob assembly is fixed.

With this configuration, an upper edge portion and a lower edge portion of the side frame have a two-fold structure, and thus the rigidity of the side frame can be further enhanced. Moreover, with this configuration, the operation stability of the operation knob and the linkage can be further improved.

In the vehicle seat described above, the side frame may be configured such that at least a portion thereof to which the operation knob assembly is fixed has a shape with a closed section as viewed from a front side.

With this configuration, the rigidity of the side frame can be further enhanced.

Advantageous Effects of Invention

According to the configuration described in claim 1, the operation knob assembly can be miniaturized, and thus the further miniaturization of the side frame can be achieved.

According to the configuration described in claim 2, the side frame can, while being miniaturized, have an enhanced rigidity. Moreover, this can provide improved operation stability to the operation knob and the linkage.

According to the configuration described in claim 3, the side frame to which the operation knob assembly is fixed can be miniaturized in the lateral direction.

According to the configuration described in claim 4 and claim 5, the rigidity of the side frame can be further enhanced.

DESCRIPTION OF EMBODIMENTS

Hereafter, a detailed description will be given of one embodiment of the present invention with reference made to the drawings where appropriate. It is to be understood that the front/rear, left/right (lateral) and upper/lower (upward/downward) used in describing the present invention are defined as viewed from an occupant sitting on the seat.

Figure 1:
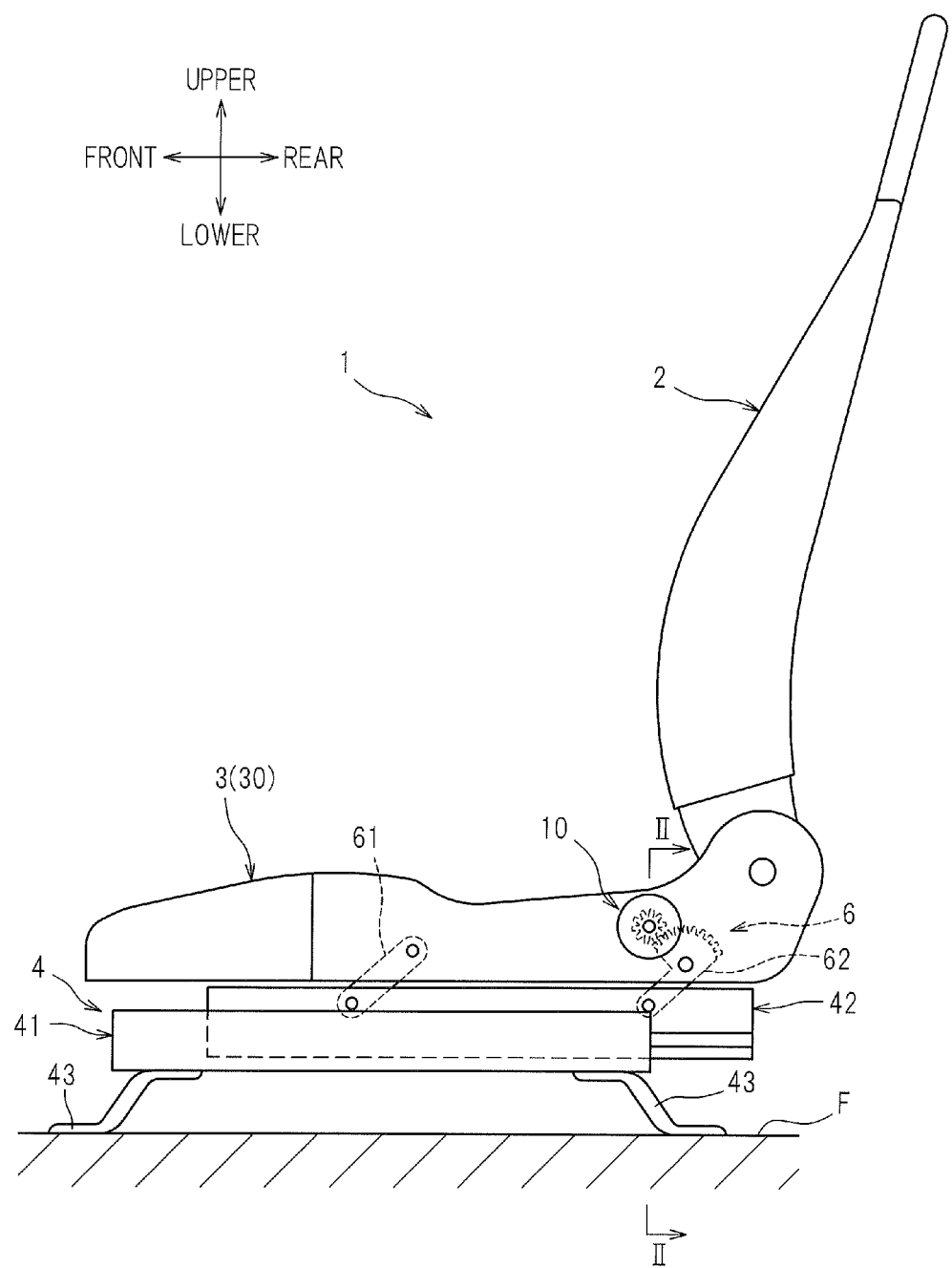
FIG. 1 is a side elevation of a vehicle seat according to one embodiment of the present invention.

As shown in FIG. 1, a car seat 1 as an example of a vehicle seat is configured such that a height of a seat bottom for an occupant to sit thereon is adjustable, and mainly includes a seat back frame 2, a seat bottom frame 3 which constitutes a frame of the seat bottom, a slide mechanism 4 for front-rear movement of the seat bottom, a linkage 6 for adjustment of the height of the seat bottom, and an operation knob assembly 10. Furthermore, the car seat 1 is provided with a seat cushion (not shown) made of urethane foam or the like, with which the outsides of the seat back frame 2 and the seat bottom frame 3 are covered.

The seat bottom frame 3 includes a pair of substantially sheet-like side frames 30 (only one of which is illustrated) which constitute left and right frames of the seat bottom; in the present embodiment, the operation knob assembly 10 is mounted to a rear portion of a side surface of the left side frame 30.

Figure 2:
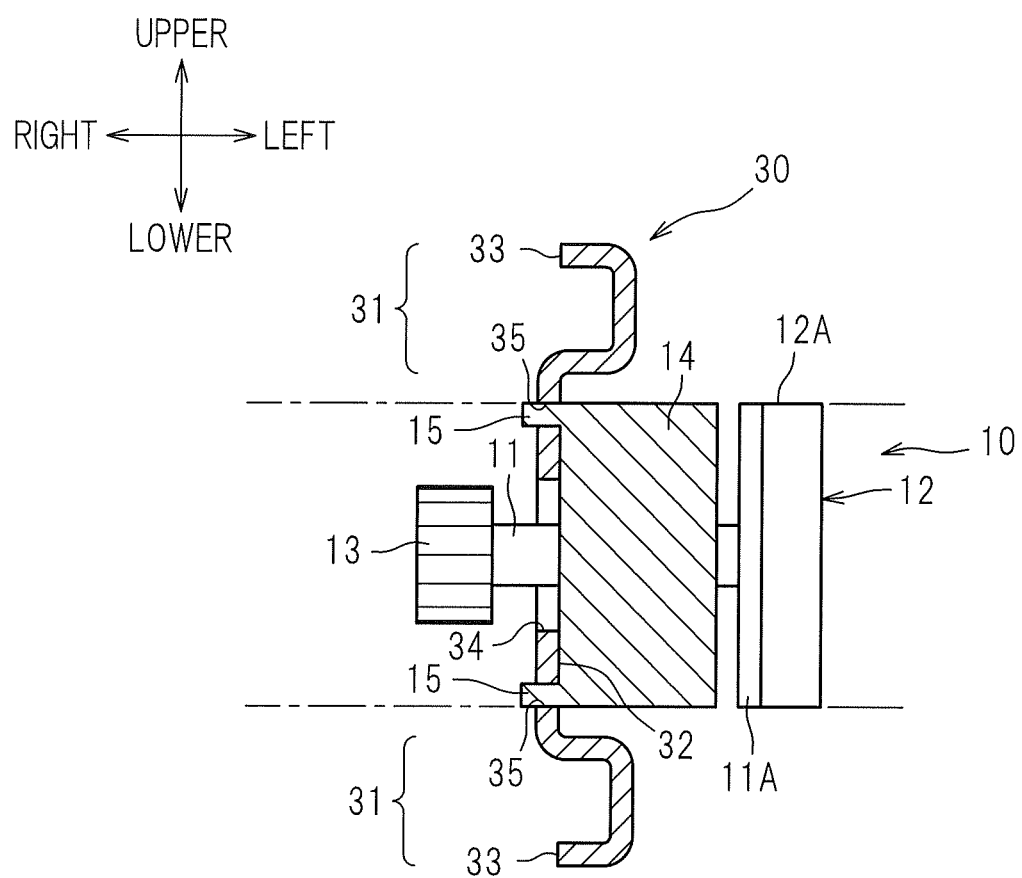
FIG. 2 is a sectional view taken along line II-II of FIG. 1, showing arrangement of an operation knob assembly and a side frame.

As shown in FIG. 2, a side frame 30 includes reinforced portions 31 bent laterally in upper and lower portions thereof. To be more specific, the reinforced portions 31 are formed by bending upper and lower end portions of the side frame 30 (metal sheet or other sheet-like member which constitutes the side frame 30), toward a laterally outer side (the side on which the operation knob assembly 10 is fixed), each of which is then bent at a midpoint in a direction along a vertically middle portion (mount surface 32) of the side frame 30 upward or downward, and further folded back so that an end 33 of each of the upper and lower end portions faces toward a laterally inner side (the side opposite to the side on which the operation knob assembly 10 is fixed), thus forming a U-shape in cross section which protrudes toward a laterally outer side from the position of the mount surface 32.

By providing the side frame 30 with such a cross sectional shape, the rigidity of the side frame 30 can be enhanced. With this configuration, links 61, 62 which will be described later and the operation knob assembly 10 are stably fixed to the side frame 30, so that the operation stability of the linkage 6 and the operation knob 12 can be improved. Particularly, in this embodiment, the upper edge and the lower edge of the side frame 30 each have a two-fold structure with one part on top of another part, and thus the rigidity can be further enhanced, with the result that the linkage 6 and the like can be provided with further improved operation stability.

In the present embodiment, the operation knob assembly 10 is mounted in a recessed portion (recess) formed of the upper portion and the lower portion (upper and lower reinforced portions 31) and the mount surface 32 to which the operation knob assembly 10 is fixed. The side frame 30 (mount surface 32) has formed therein a through hole 34 in which a gear 13 and a rotary shaft 11 (which will be described later) of the operation knob assembly 10 are inserted, and through holes 35 which engage with fixing portions 15 of the operation knob assembly 10.

Returning to FIG. 1, the slide mechanism 4 is a mechanism for allowing the side frames 30 (seat bottom) to be slid in the front-rear direction, and mainly includes lower rails 41 and upper rails 42. Two lower rails 41 each have an elongated shape are provided at the left and at the right at a predetermined distance (only one is illustrated in the drawing). Each lower rail 41 is fixed to the floor F of the car (vehicle) via front and rear brackets 43.

The upper rails 42 each have an elongated shape are engaged with the lower rails 41, slidably in the front-rear direction. The upper rails 42 are connected to the seat bottom frame 3 via links 61, 62, and with this configuration, the seat bottom can be slid in the front-rear direction relative to the lower rails 41 (floor F of the car).

Figure 3:
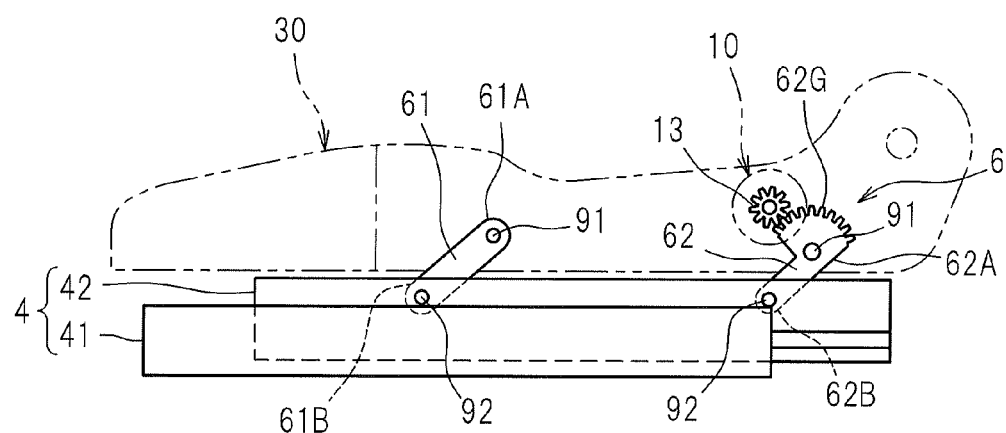
FIG. 3 is a schematic diagram of a linkage, which includes (a) a view of a seat in a lowered position, and (b) a view of the seat in a lifted position.
Figure 3:
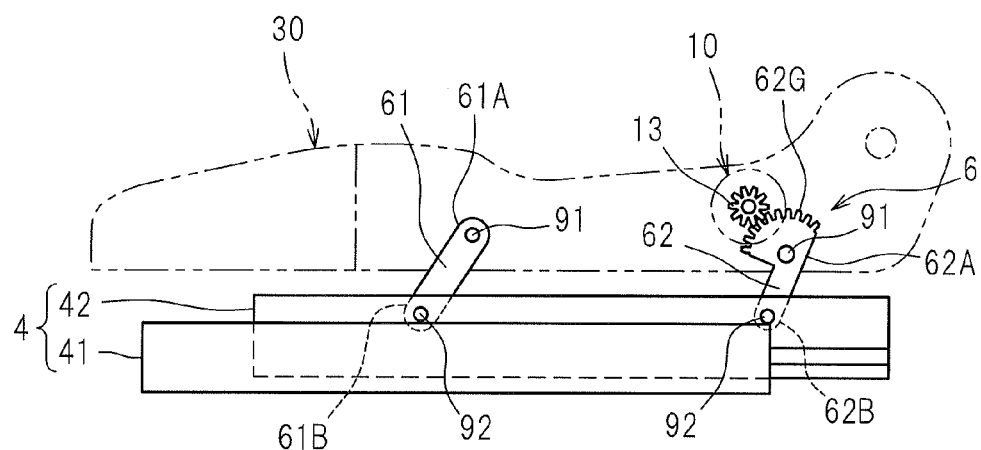

As shown in FIG. 3, the linkage 6 is a mechanism for adjustment of the height of the side frames 30, and includes front links 61 and rear links 62. An upper portion 61A, 61B of each link 61, 62 is pivotally connected to the side frame 30, and a lower portion 61B, 62B thereof is pivotally connected to the upper rail 42, to form a four-bar linkage so that the side frame 30 can be moved up and down relative to the upper rail 42.

To be more specific, the front links 61 are provided one at the left and one at the right (only one of two front links is illustrated in the drawing), and an upper portion 61A of each front link 61 is connected to the left or right inner side surface of the side frame 30 by a pin 91 so as to form a joint thereat. The pin 91 supports the front link 61 in a manner that renders the front link 61 pivotable, so that the front link 61 can pivot on the side frame 30. The lower portion 61B of the front link 61 is connected to the upper rail 42 by a pin 92 so as to form a joint thereat. The pin 92 supports the front link 61 in a manner that renders the front link 61 pivotable, so that the front link 61 can pivot on the upper rail 42.

The rear links 62 are provided one at the left and one at the right (only one of two rear links is illustrated in the drawing), and an upper portion 62A of each rear link 62 is connected, as with the case with the front link 61, to the left or right inner side surface of the side frame 30 by a pin 91 so as to pivot relative to the side frame 30. An upper portion 62A of a left rear link 62 has a sector gear portion 62G formed therein. A lower portion 62B is also, as is the case with the front link 61, connected to the upper rail 42 by a pin 92, and thus is pivotable relative to the upper rail 42.

The left and right links 61, 62 may be connected by a pipe or the like so that the left and right linkages are caused to pivot at the same time.

As shown in FIG. 2, the operation knob assembly 10 mainly includes a rotary shaft 11, an operation knob 12 provided at an outer end of the rotary shaft 11, a gear 13 provided at an inner end of the rotary shaft 11, and a main body case 14 fixed to the mount surface 32 and configured to support the rotary shaft 11 in a manner that renders the rotary shaft 11 pivotable.

The operation knob 12 is fixed to a mount 11A formed on the outer end of the rotary shaft 11, for example, by a bolt or the like, and configured to rotate via the rotary shaft 11 integrally together with the gear 13. In the present invention, the shape of the operation knob 12 is not limited to a particular shape, and thus, for example, may be like a dial, or like a lever.

The gear 13 meshes with the gear portion 62G of the rear link 62 when the operation knob assembly 10 is fixed to the side frame 30 (see FIG. 3). Although not illustrated, the rotary shaft 11 is configured in a manner as known in the art to be rotatable while imparting a friction against the main body case 14.

The main body case 14 includes fixing portions 15 protruding toward the side frame 30, at an inside of an outer peripheral surface 12A of the operation knob 12 as viewed from a direction (lateral direction) of extension of the rotary shaft 11 of the operation knob 12. The operation knob assembly 10 is fixed to the side frame 30 by the fixing portions 15. In the present invention, the number of fixing portions 15 is not limited to a particular number, that is, one or more fixing portions may be provided.

The fixing portions 15 may be formed by cutting and raising a part of a metal sheet or by bending an end portion of the metal sheet, for example, if the main body case 14 (at least a left or right inner side wall of the main body case 14) is formed of the metal sheet. Alternatively, they may be formed by welding pin-like members to the left or right side wall of the main body case 14. If the main body case 14 is formed of a resin or the like, they may be formed by integral molding. They may also be formed by screwing or press fitting end portions of pin-like members shaped like anchor bolts into the main body case 14.

Figure 4:
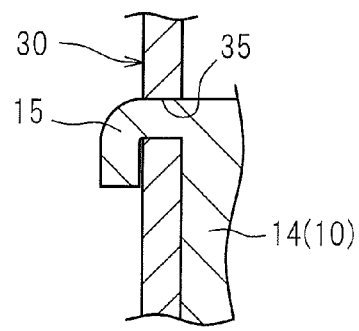
FIG. 4 includes views (a)-(d) showing specific examples of a method of fixing the operation knob assembly and the side frame together.
Figure 4:
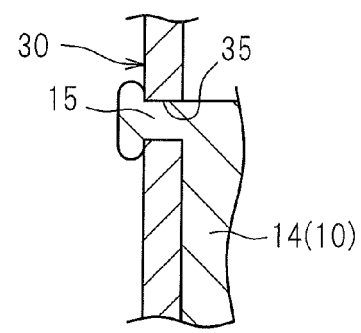
Figure 4:
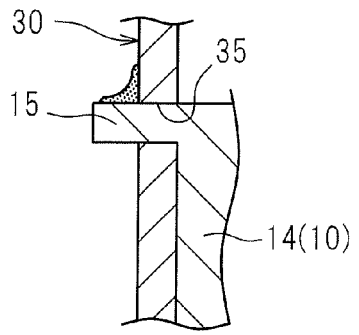
Figure 4:
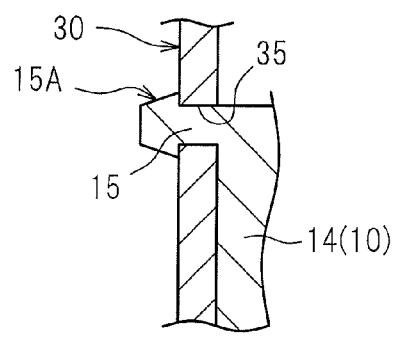

In the present invention, a method for fixing the fixing portions 15 and the side frame 30 is not limited to a particular one, and any method can be selected appropriately depending on the material and forming method of the fixing portions 15. To be more specific, the fixing portions 15 (operation knob assembly 10) and the side frame 30 may be fixed, for example, by bending ends of the fixing portions 15 engaged in the through holes 35 of the side frame 30, as shown in FIG. 4 (a). Alternatively, they may be fixed by caulking ends of the fixing portions 15 engaged in the through holes 35 of the side frame 30, as shown in FIG. 4 (b).

The operation knob assembly 10 and the side frame 30 may be fixed by welding the ends of the fixing portions 15 engaged in the through holes 35 of the side frame 30 and the side frame 30 together, as shown in FIG. 4 (c). Alternatively, they may be fixed by forming stopper portions 15A beforehand at ends (tip ends) of the fixing portions 15 and snapping the fixing portions 15 into the through holes 35 of the side frame 30, as shown in FIG. 4 (d).

When the operation knob assembly 10 is fixed to the side frame 30, the gear 13 comes in mesh with the gear portion 62G of the rear link 62, as shown in FIG. 3. The car seat 1 is configured such that, as the operation knob 12 is caused to rotate, the gear 13 rotates, and its rotation is transmitted to the gear portion 62G, whereby the height of the seat bottom (side frame 30) can be adjusted.

To be more specific, when the operation knob 12 is operated from the state shown in FIG. 3 (a) to rotate clockwise in the drawing, the rear link 62 is raised frontward. Since the rear link 62, the side frame 30, the front link 61 and the upper rail 42 constitute a four-bar linkage, when the rear link 62 is raised frontward, the front link 61 is also raised frontward, and thus the side frame 30 is moved upward (see FIG. 3 (b)). In this way, the position of the seat bottom can be made higher.

On the other hand, when the operation knob 12 is operated from the state shown in FIG. 3 (b) to rotate counterclockwise in the drawing, the rear link 62 is caused to fall rearward. Then, the front link 61 is also caused to fall rearward, and thus the side frame 30 is moved downward (see FIG. 3 (a)). In this way, the position of the seat bottom can be made lower.

With the above-described configuration, according to the present embodiment, the following advantageous effects can be achieved.

Since the operation knob assembly 10 includes the fixing portion(s) 15 protruding toward the side frame 30 in a position inwardly of the operation knob 12, the operation knob assembly 10 can be downsized in the radial directions of the operation knob 12, in comparison with another configuration in which an operation knob assembly includes fixing portions protruding outward in the radial directions of the operation knob 12. Accordingly, the space for fixing the operation knob assembly 10 (e.g., area of the mount surface 32) can be reduced, so that the further miniaturization of the side frame 30 can be achieved.

Since the side frame 30 includes the reinforced portions 31 in upper and lower positions of the side frame 30, the side frame 30 can, while being miniaturized, have an enhanced rigidity. Moreover, the enhanced rigidity can provide improved operation stability to the operation knob 12 and the linkage 6.

Particularly in this embodiment, the upper edge portion and a lower edge portion (reinforced portions 31) of the side frame 30 have a two-fold structure, and thus the rigidity of the side frame 30 can be further enhanced, and the operation stability of the operation knob 12 and the linkage 6 can be further improved.

Although the embodiment of the present invention has been described above, the present invention is not limited to the above-described embodiment. Specific configurations may be modified, where appropriate, without departing from the gist of the present invention.

In the above-described embodiment, the upper portions 61A, 62A of the links 61, 62 are connected to a laterally inner side surface of the side frame 30, but the present invention is not limited to this configuration, and may be connected to the laterally outer side surface of the side frame 30. In this embodiment, the gear 13 of the operation knob assembly 10 may be provided at a laterally outer side of the side frame 30.

In the above-described embodiment, the reinforced portions 31 of the side frame 30 are shaped to have a cross section such that upper and lower ends of the side frame 30 are bent toward a laterally outer side, and further folded back so that each of the upper and lower ends 33 faces toward a laterally inner side, but the present invention is not limited to this configuration. For example, the reinforced portions 31 may be formed by bending the upper and lower ends of the side frame 30 toward a laterally outer side (the side on which the operation knob assembly 10 is fixed) into a generally L-shaped cross section, as shown in FIG. 5 (a); alternatively, they may be formed by bending the upper and lower ends of the side frame 30 toward a laterally inner side (the side opposite to the side on which the operation knob assembly 10 is fixed) into a generally L-shaped cross section, as shown in FIG. 5 (b).

Figure 5:
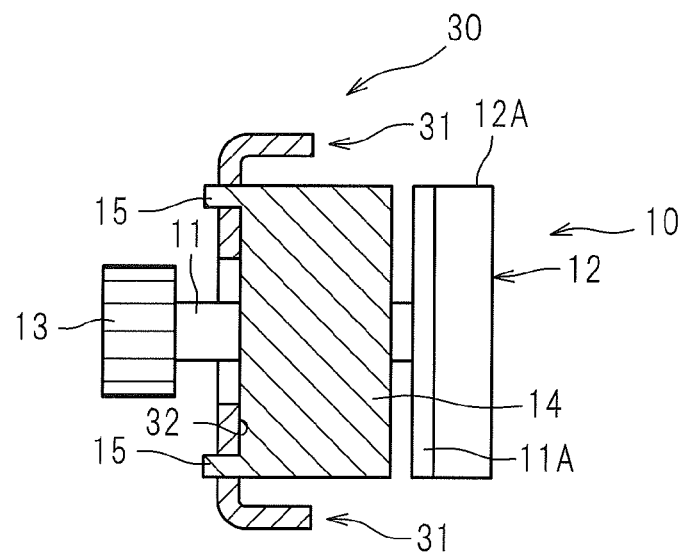
FIG. 5 includes views (a), (b) corresponding to the sectional view taken along the line II-II in FIG. 1, showing the configuration of the side frame according to a modified embodiment.
Figure 5:
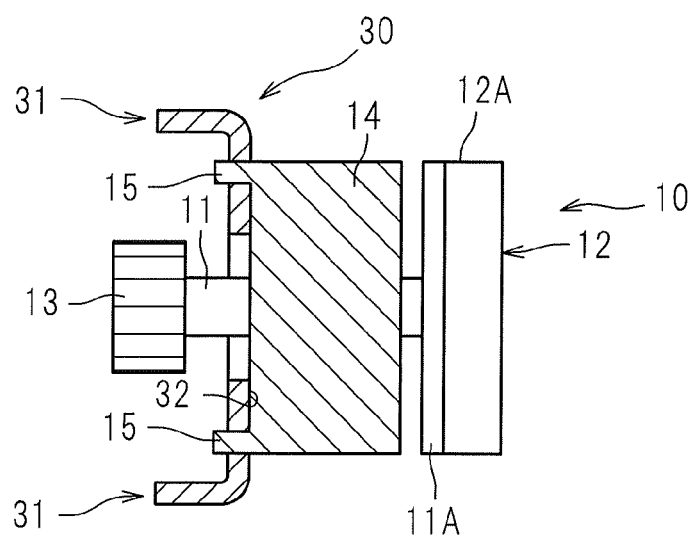

In the configurations as shown in FIGS. 5 (a), (b), as well, the rigidity of the side frame 30 can be improved. With the configuration as shown in FIG. 5 (a) in which the upper and lower ends of the side frame 30 are bent toward the laterally outer side, in particular, the configuration in which the gear 13 is provided at a laterally outer side of the side frame 20 (not illustrated in the drawing), the side frame 30 (the side frame 30 to which the operation knob assembly 10 is fixed) can be miniaturized in the lateral direction, in comparison with the configuration shown in FIG. 5 (b).

Moreover, a reinforced portion may be comprised of at least one ridge portion formed by bending a sheet-like member which constitutes the side frame. The reinforced portion may be formed by fixing a sheet-like member or a pipe-like member by welding.

In order to enhance the rigidity of the side frame 30, the side frame 30 may have a shape with a closed section as viewed from a front side (in the front-rear direction). To be more specific, as shown in FIG. 6, the side frame 130 includes an outer frame portion 131 shaped like a letter U in cross section, and an inner frame portion 132, and upper portions of these frame portions 131, 132 are welded together and lower portions of these frame portions 131, 132 are welded together so as to make them into an integral member, whereby the closed section as viewed from the front side can be formed.

Figure 6:
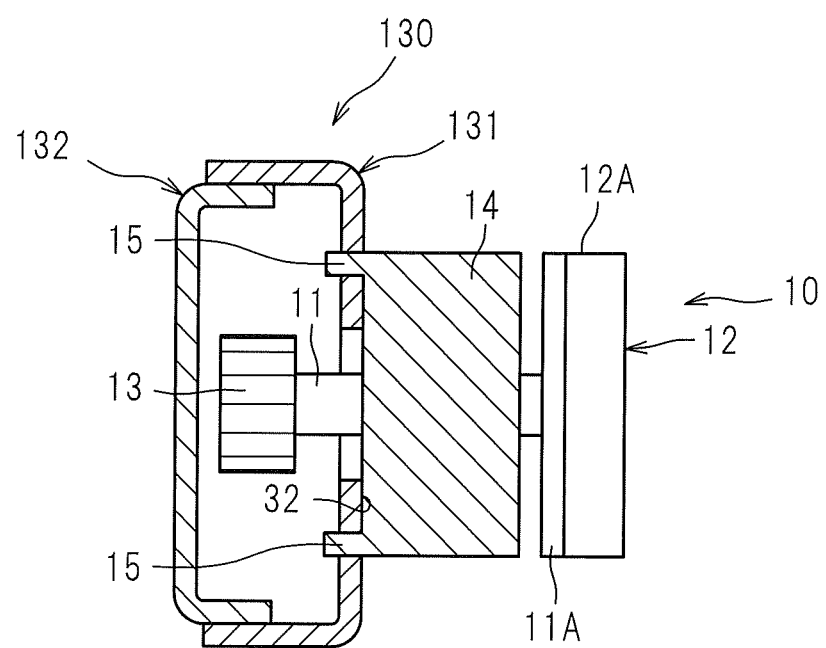
FIG. 6 is a view corresponding to the sectional view taken along the line II-II in FIG. 1, showing the configuration of the side frame according to another modified embodiment.

The reinforcing structure of the side frame according to the present invention (e.g., reinforcing portions 31, and closed-section structure shown in FIG. 6) may be formed in upper and lower portions in at least a portion of the side frame to which the operation knob assembly is fixed, and it suffices.

In the above-described embodiment, the operation knob assembly 10 is mounted to a rear portion of a side surface of the left side frame 30, but the position to which the operation knob assembly is mounted as construed as consistent with the present invention is not limited to any particular position. Moreover, in the above-described embodiment, the operation knob assembly 10 is mounted to the left side frame 30, but this places no limitation, and thus it may be mounted to the right side frame.

A structure of the operation knob assembly 10 as shown in describing the embodiment above is exemplary only, and the present invention is not limited thereto. For example, as described above, the gear 13 may be provided at a laterally outer side of the side frame 30.

A structure of the linkage 6 for adjustment of the height of the side frame 30 (i.e., members which constitute the four-bar linkage, and the shape of each link 61, 62, etc.) is exemplary only, and the present invention is not limited thereto. For example, a gear portion may be formed on an upper portion of the front link.

In the above-described embodiment, a seat for a car such as an automobile is illustrated by way of example as an application of a vehicle seat, but the present invention is not limited to this application, and can also be applied to any other type of vehicle seat, for example, a seat for a ship or for an aircraft.

The invention claimed is:

1. A vehicle seat with a height adjustable seat bottom, comprising:
    a side frame which constitutes left and right frames of the seat bottom;
    a linkage configured to render a height of the side frame adjustable; and
    an operation knob assembly including a rotary shaft, an operation knob provided for rotating the rotary shaft, a gear provided at an inner end of the rotary shaft, and a main body case at which the rotary shaft is rotatably supported, the operation knob being configured to be rotated to thereby actuate the linkage via the gear for adjustment of the height of the side frame,
    wherein the operation knob assembly includes a fixing portion protruding from an inner side of the main body case towards the side frame at a position inwardly of an outer peripheral surface of the main body case as viewed from a direction of an axis of rotation of the operation knob,
    wherein the side frame has a through hole in which the fixing portion is engaged whereby the fixing portion is fixed to the side frame, and
    the fixing portion is provided integrally with the main body case.

2. The vehicle seat according to claim 1, wherein the side frame includes laterally bent reinforced portions disposed at least in positions above and below a portion of the side frame to which the operation knob assembly is fixed.

3. The vehicle seat according to claim 2, wherein the reinforced portions are formed by bending upper and lower ends of the portion to which the operation knob assembly is fixed, toward a side on which the operation knob assembly is fixed.

4. The vehicle seat according to claim 3, wherein respective end portions of the upper end and the lower end are folded back toward a side opposite to the side on which the operation knob assembly is fixed.

5. The vehicle seat according to claim 1, wherein at least a portion of the side frame to which the operation knob assembly is fixed has a shape with a closed section as viewed from a front side.

6. The vehicle seat according to claim 1, wherein the side frame has a through hole in which the fixing portion of the operation knob assembly is engaged.

7. The vehicle seat according to claim 1, wherein the operation knob assembly further includes a rotary shaft, and a main body case at which the rotary shaft is rotatably supported, the fixing portion being provided in the main body case; and
    wherein the side frame has a first through hole in which the rotary shaft of the operation knob assembly is disposed, and a second through hole in which the fixing portion of the main body case is engaged.

8. The vehicle seat according to claim 1, wherein the operation knob assembly further includes a rotary shaft, a main body case at which the rotary shaft is rotatably supported, and a second fixing portion protruding toward the side frame and being fixed to the side frame; and
    wherein the rotary shaft is located between the fixing portion and the second fixing portion which are provided in the main body case.

9. The vehicle seat according to claim 1, wherein the operation knob assembly further includes a rotary shaft, and a main body case at which the rotary shaft is rotatably supported; and
    wherein the fixing portion of the operation knob assembly is provided integrally with the main body case.

10. The vehicle seat according to claim 1, wherein the fixing portion protrudes from the inner side of the main body case toward the gear, and
    wherein a length of the fixing portion which protrudes from the inner side of the main body case is shorter than a distance between the main body case and the gear.

11. The vehicle seat according to claim 10, wherein the length of protrusion of the fixing portion before the operation knob assembly is fixed to the side frame by the fixing portion is shorter than the distance between the main body case and the gear.

12. The vehicle seat according to claim 2, wherein each of the reinforced portions includes a portion extending in a direction of protrusion of the fixing portion, wherein an end of extension of said portion is in a position farther in a lateral direction from the inner side of the main body case than a position of a protruding end of the fixing portion.

13. The vehicle seat according to claim 2, wherein each of the reinforced portions overlaps at least one of the main body case and the fixing portion as viewed vertically from above or from below.

14. The vehicle seat according to claim 12, wherein each of the reinforced portions overlaps at least one of the main body case and the fixing portion as viewed vertically from above or from below.

* * * * *